Figure 1:
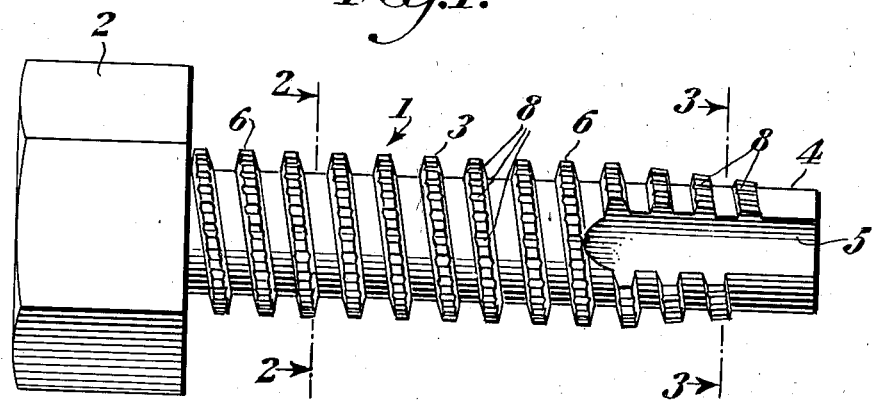

Oct. 26, 1937.  E. J. McMANUS  2,096,937

THREAD CUTTING FASTENER

Filed Jan. 14, 1936

INVENTOR
Edward J. McManus
BY
ATTORNEYS

Patented Oct. 26, 1937

2,096,937

UNITED STATES PATENT OFFICE 2,096,937

THREAD-CUTTING FASTENER

Edward J. McManus, Orange, N. J.

Application January 14, 1936, Serial No. 59,028

2 Claims. (Cl. 85—47)

This invention relates to improvements in a screw fastener designed for cutting a thread in a work piece of metal or other hard material.

Important objects of the invention are to provide a thread-cutting screw fastener of improved design, and to provide such a fastener designed to screw into hard material easily and to hold securely.

Other objects of the invention will appear hereinafter.

Figure 2:
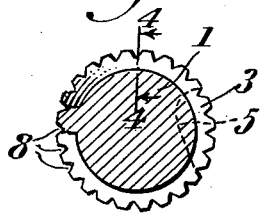
Figure 3:
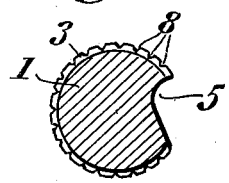

In the drawing,

Fig. 1 is a side view of a self-tapping screw fastener embodying the invention;

Fig. 2 a section on the line 2—2 of Fig. 1;

Fig. 3 a section on the line 3—3 of Fig. 1; and

Figure 4:
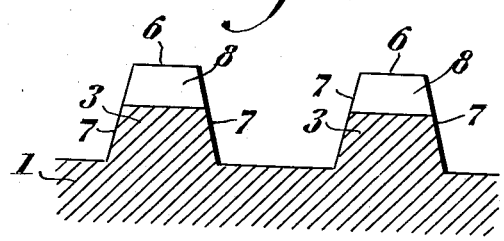

Fig. 4 an enlarged detail section on the line 4—4 of Fig. 2.

The screw fastener shown as embodying the invention includes a shank 1 and an integral abutment head 2 borne by one end of the shank. In the present showing the head has flat sides for wrench engagement. However the head may be of any suitable form. An external screw thread 3 is formed on the shank. The thread is of improved design to enable it to more easily cut a complementary thread in a hard work piece or part to be fastened. It is also designed to hold securely in the work piece by strong resistance to unscrewing and by strong resistance to tension stress.

At its entering end the shank 1 preferably has a pilot portion 4 whose periphery is smooth and cylindrical except where it is interrupted by a flute. The diameter of the pilot portion may be the same as the root diameter of the thread 3, as shown, or of less diameter if desired. The thread follows the pilot portion and may, as shown, extend along the shank clear to the head 2. Along several of its leading convolutions the thread rib diminishes in height gradually toward the pilot portion so that the crest of the rib lies on a cone tapering toward the leading end of the shank. Along the following convolutions of the thread the rib crest lies on a cylinder. A flute 5 extends from the leading end of the shank straight inward along the length of the shank which includes the pilot portion and the tapered portion of the thread. The flute may, as shown, extend inward far enough to intersect a portion of the rib having a complete profile.

The thread rib preferably has a profile providing it with a wide straight crest 6 parallel, or nearly parallel to the thread axis, and straight side faces 7 disposed at a steep angle to the thread axis. By a "wide" crest is meant a crest whose width is material with reference to the height or depth of the rib. A thread rib with an Acme profile is shown in the drawing and such a profile has been found very satisfactory. The profile may, however, be of other types such, for example, as the Dardelet type, or the completely square-cut type. Preferably, as shown, the groove of the thread is wider than the rib in order to increase the pitch or lead, for more rapid advance of the screw. The bottom of the groove may be cylindrical, as shown.

The crest of the thread rib has a helical series of notches 8 spaced therealong. These notches are an important feature of the invention. They are rather closely arranged along the rib crest and the series may, as shown, extend throughout all of the convolutions of the rib. It is desirable that the depth of the notches should not exceed the depth of the thread rib. In fact it is preferable that their depth be materially less than that of the rib and they are shown as less than one half the maximum depth of the rib. Their width is materially less than said rib depth. The notches provide the crest portion of the thread rib with numerous thread-cutting edges and they also have a thread locking function, as will be explained hereinafter.

It is intended primarily that the invention be embodied in small screws of say, diameters up to three-eighths of an inch. The invention may, however, be employed satisfactorily in larger screws. In the employment of a small screw there should first be drilled in the work piece or part or parts to be fastened a hole of slightly less diameter than the maximum crest diameter of the screw thread. For a screw of a quarter-inch diameter the drilled hole in a steel part may be between one sixty-fourth and one thirty-second of an inch undersize, for example. The pilot end 4 of the screw is freely entered in the undersize hole and the thread-cutting action is begun by the tapered leading portion of the thread, the flute providing said thread portion with cutting edges and also affording clearance for escape of chips. Most of the thread cutting will be performed by the tapered and fluted length of the screw and the screw will cut its way easily through hard material. The cutting edges provided by the crest notches 8 will also have a cutting or scraping action so that the thread cutting is performed throughout a long length of the screw with consequent reduction in the force required to turn the screw. The screw is preferably made of steel, case-hardened or pack-hardened, and it should be so hardened after it is completely formed with the notches 8 and the flute 5.

In driving the screw and cutting the thread in the hole much heat is developed. When the material of the work piece or fastened part cools it contracts against the crest of the screw thread and also contracts into the numerous crest notches 8 to lock or freeze the screw in the hole and firmly resist unscrewing. This locking effect is assisted by the shallowness of the notches. The notches confine therein the small chips or powder which they scrape from the wall of the hole and cause a clogging effect. In the operation of forming the notches, by either cutting or rolling, small burrs are thrown up inevitably upon the edges of the numerous notches. Burrs are also thrown up on the cut thread of the work piece by the action of the cutting edges of the notches and said burrs project into the notches. The burrs on the screw and on the work piece assist in the thread-locking action.

The substantially square-cut profile of the thread rib provides for strong resistance to tension stress axially of the screw. My invention renders it practicable to use such a desirable thread. Heretofore it has been customary to employ a thread with a rib of V form in self-tapping screws because of the fact that such a rib will cut its way more easily into the work piece. A V thread rib, however, offers less resistance to tension because the decided slope of the abutment side faces of the thread rib enables the rib to cam its way out. My invention enables the substantially square-cut thread, providing greater tensile strength, to cut its way more easily into the work piece. The design of the screw so facilitates the cutting action that a screw formed of rolled steel, case-hardened, can be screwed into a rolled steel part by the exertion of moderate force upon a wrench and therefore without danger of breaking the screw.

What I claim:

1. A thread-cutting and self-locking screw fastener comprising a body with an external screw thread for screwing into a slightly undersize hole and cutting therein a shallow internal thread, characterized in that the fastener thread is profiled to provide its rib with a wide crest substantially parallel in cross section to the thread axis and with a rear abutment face disposed at a steep angle to the thread axis and meeting said crest at a steep angle thereto to positively resist tension stress longitudinally of the fastener, said crest having a helical series of numerous notches closely arranged therealong, for the purpose set forth, the depth of said notches not exceeding one-half of the maximum depth of the rib of the fastener thread and their width being materially less than said maximum rib depth, to confine chips cut from the wall of the hole and produce a clogging and locking effect upon the fastener thread.

2. A thread-cutting and self-locking screw fastener comprising a body with an external screw thread therealong for screwing into a slightly undersize hole and cutting therein a shallow internal thread, characterized in that the fastener thread is profiled to provide its rib with a wide crest substantially parallel to the thread axis and with a rear abutment face disposed at an abrupt angle to the thread axis and meeting said crest at an abrupt angle to positively resist tension stress longitudinally of the fastener, the fastener having a flue for thread cutting extending longitudinally inward from its leading end and interrupting a leading length of the fastener thread and of greater depth than the thread, the crest of the fastener thread having a helical series of numerous notches for the purpose set forth arranged closely along said flute-interrupted length of the thread and along a following fastening length of the thread, and said notches being shallow in comparison with the maximum depth of the rib of the fastener thread and their width being less than said maximum depth, to confine chips cut from the wall of the hole and produce a clogging and locking effect upon the fastener thread.

EDWARD J. McMANUS.